United States Patent [19]

Salvestrini et al.

[11] Patent Number: 5,781,328
[45] Date of Patent: Jul. 14, 1998

[54] ELECTRO-OPTICAL MODULATOR

[75] Inventors: Jean-Paul Salvestrini; Marc Fontana, both of Metz, France

[73] Assignee: Universite de Metz, Metz, France

[21] Appl. No.: 693,318

[22] PCT Filed: Feb. 14, 1995

[86] PCT No.: PCT/FR95/00169

§ 371 Date: Aug. 12, 1996

§ 102(e) Date: Aug. 12, 1996

[87] PCT Pub. No.: WO95/22781

PCT Pub. Date: Aug. 24, 1995

[30] Foreign Application Priority Data

Feb. 17, 1994 [FR] France ................ 94 02015

[51] Int. Cl.$^6$ ........................ G02F 1/01
[52] U.S. Cl. .......................... 359/252
[58] Field of Search ................ 359/252

[56] References Cited

U.S. PATENT DOCUMENTS 5,157,539 10/1992 Beasley .................... 359/251

OTHER PUBLICATIONS

T. Tsukamoto et al., *Deflection of Light Induced by Ferro-electric–ferroelastic Crystals*,Japanese Journal of Applied Physics, Supplement 24–3, vol. 24 (1985), pp. 165–168.

R. Popranski et al., *Specific Heat of Hydrogen Selenate Crystals*, Ferroelectrics, vol. 79, 1988, pp. 245–248.

A. Waskowska et al., *Ammonium Deuterium Selenate and Rubidium Deuterium Selenate*, ACTA Crystallographica, vol. B38, 1982, pp. 2017–2020.

J. Salvestrini et al., *New Material With Strong Electro–Optic Effect: Rubidium Hydrogen Selenate (RbHSeO$_4$)*, Applied Physics Letters, vol. 64, No. 15, Apr. 1994, pp. 1920–1922.

Primary Examiner—Richard A. Rosenberger
Attorney, Agent, or Firm—Nilles & Nilles SC

[57] ABSTRACT

The use in an electro-optical modulator of an electro-optical crystal in the form of a solid-solution compound of formula $(NH_4)_x Rb_{1-x} H_{1-y} D_y SeO_4$, x and y being concentration coefficients varying from 0 to 1, (crystals of hydrogenated or deuterated rubidium or ammonium selenates) in order to modify the polarization, the phase or the intensity of an incident light beam, using a small control voltage.

16 Claims, 1 Drawing Sheet

ELECTRO-OPTICAL MODULATOR

BACKGROUND OF THE INVENTION

1. Field of the Invention

The invention relates to an electro-optical modulator. Such devices are used for modulating light beams, that is to say for modifying their polarization, their phase, their frequency or their intensity, by modifying the medium through which they propagate, by the action of an electric field.

By way of application of such modulators, mention may be made of:

- wavelength multiplexing, making it possible to create a plurality of beams of different wavelength from an incident beam of given wavelength, by frequency modulation,
- laser pulse compression by frequency modulation,
- laser pulse generation by polarization modulation,
- spatial switching by polarization modulation,
- optical telecommuniation by intensity modulation.

Electro-optical modulators are made either from bulk materials, in general single crystals constituting the electro-optical medium through which the light beam to be modulated passes, or from thin films or waveguides. The latter make it possible to obtain modulation in a wide frequency range (up to several gigahertz), which is very useful in telecommuniations in order to increase the data transfer rate. Such devices are of complex design and expensive.

Although limited to uses at lower frequencies (from several hertz to several hundreds of megahertz), modulators made from bulk crystals are widely used, in particular for intensity or phase modulation functions.

2. Description of the Related Art

Almost all crystal modulators currently marketed use as an electro-optical material a crystal of KDP (potassium dihydrogen phosphate) or ADP (ammonium dihydrogen phosphate). The document U.S. Pat. No. 5,157,539 describes an electro-optical modulator using a crystal of KDP. The electro-optical qualities of these materials are fully known. They have the advantage of being materials whose synthesis is fully mastered and inexpensive.

Some publications:

T. Tsukamoto et al., Japanese Journal of Applied Physics, Vol. 24 (1985), Supplement 24-3, pages 165–168, R. Poprawski et al., Ferroelectrics, Vol. 79 (1988), pages 245–248, A. Waskowska and Z. Cafzpla, Acta Cryst., Vol B38 (1982), pages 2017–2020, disclose different electrical properties of $RbHSeO_4$ and $NH_4SeO_4$, and also its cyrstals in partly denterated, which properties do not disclose if it is possible to use it in an electro-optical modulator.

Among the materials which are used, mention may also be made of inorganic ferroelectrics ($LiNbO_3$, $KNbO_3$, $BaTiO_3$), which generally have high electro-optical coefficients and refractive indices. However, their dielectric permittivity is high and their production is laborious and poorly mastered.

The direction of the electric field applied to the electro-optical material may be orthogonal to (this case is referred to as transverse configuration) or else collinear with (this case is referred to as longitudinal configuration) the direction of propagation of the light beam.

The case of a crystal in the form of a parallelepiped will be considered, with L and d the dimensions of the crystal, respectively in the direction of propagation of the beam to be modulated and in the direction of the electric field. L is equal to d in the case of a longitudinal configuration.

A dominant factor of a modulator is the half-wave voltage, defined by $V_\pi = (a*d)/(n^3*r*L)$, with

- a the wavelength of the beam,
- n the refractive index of the crystal,
- r the electro-optical coefficient of the crystal.

If $L=d$, then $V_\pi = V_{\pi*} = a/(n^3*r)$. This is referred to as the reduced half-wave voltage, which is a factor depending only on the nature of the crystal.

The high-wave voltage $V_\pi$ is the voltage to be applied to the crystal in order to cause a phase shift of $\pi$ radians between the components of the polarization of a light beam passing through the modulator, that is to say the change from a maximum to a minimum in the intensity of the light transmitted through a suitably oriented polarizer. The modulation efficiency of a light beam depends greatly on $V_\pi$. It is important for this voltage $V_\pi$ to be as small as possible.

The abovementioned hydrogen-bonded compounds (ADP, KDP) have electro-optical coefficients with non-negligible values. However, they have some drawbacks and actually require high control voltages.

Thus, for a wavelength a equal to 0.633 microns:

$V_\pi* \approx 15{,}000$ V for a KDP crystal, $V_\pi* = 10{,}000$ V for an ADP crystal.

In order to limit the value of the electric voltage applied, the modulators comprise crystals of large dimension L and small dimension d. This gives voltages $V_\pi$ of the order of several hundreds of volts. It nevertheless remains necessary to use a unit which amplifies the voltage applied. This leads to the electrical control device associated with the modulator being large and increases the cost of the system.

Furthermore, the electrical control power is proportional to the pass-band. It will therefore be beneficial to have a material whose half-wave voltage and dielectric permittivity are as small as possible.

Finally, the use of large control voltages leads to a risk of damage to the crystal and consequently a reduction in the life of the modulator.

Furthermore, the birefringence of the crystals used to date depends greatly on temperature, which may lead to a shift in the operating point of the modulator. This makes it necessary to install the material in a chamber which is perfectly controlled in terms of temperature and/or to compensate for the natural birefringence. This compensation may be performed by inserting into the modulator a second crystal whose dimensions are strictly identical to the first and whose orientation is such that its natural birefringence exactly cancels that of the first crystal.

Connecting the crystals in series leads, further to the production constraints leading to an increase in the manufacturing costs of the modulators (the crystals are actually in the form of long thin plates which are difficult to produce when manufacturing single crystals of high optical quality), to a number of drawbacks due to the increase in the length of the crystal to be crossed:

- limitation of the passband of the modulator. The modulation frequency is an important parameter in the definition of the specifications of an electro-optical device. The cut-off frequency of an optical communication device, for example, may actually govern the data transfer rate. Moreover, a modulator electro-optical crystal can be modelled to first approximation by an RC electrical circuit. The value of the capacitance of a capacitor is proportional to the surface area of its electrodes. It will therefore be beneficial to use a small crystal in order for it to have a small equivalent capacitance.

increase in the losses due to absorption, leading to a reduction in the intensity of the light beam passing through the crystal.

SUMMARY OF THE INVENTION

The inventor has made efforts to produce an electro-optical modulator using a single crystal which is inexpensive to synthetize and which makes it possible to overcome, as far as possible, the constraints mentioned above. In the case in point, he proposes the use of a type of material which has been found to have the following characteristics:

- a half-wave voltage value which is generally less than the aforementioned values, making it possible to use a modulator employing a low control power, on the basis of a small crystal,
- a very low sensitivity to temperature, leading to the possibility of producing a modulator without having to provide temperature compensation means, and
- permitting operation in the same frequency range as conventional modulators.

The invention thus proposes the use in an electro-optical modulator of an electro-optical crystal in the form of a solid-solution compound of formula $(NH_4)_xRb_{1-x}H_{1-y}D_ySeO_4$, x and y being concentration coefficients varying from 0 to 1, in order to modify the polarization, the phase or the intensity of an incident light beam, using a small control voltage.

The invention also relates to an electro-optical modulator comprising:
- an electro-optical crystal,
- a voltage source,
- electrodes connected to the voltage source in order to produce an electric field in the crystal,
- characterized in that the crystal is a solid-solution compound of formula $(NH_4)_xRb_{1-x}H_{1-x}yD_ySeO_4$, x and y being concentration coefficients varying from 0 to 1.

The type of material envisaged in the invention for producing an electro-optical modulator has a reduced half-wave voltage $V_\pi^*$ which can be limited to approximately 270 volts, that is to say of the order of 55 times less than for KDP and almost 37 times less than for ADP. The voltage $V_\pi$ consequently remains small without having to use a crystal of large dimension L. This reduces the absorption losses in the crystal. The fabrication (and more precisely growth) time of the crystals is also reduced.

The type of crystal proposed in the invention is furthermore five to twenty times less sensitive to temperature variations than most materials currently used (ADP, KDP).

Finally, it makes it possible to modulate light waves both in the visible range and in the near infrared. It is therefore possible to use the modulator in the same range as conventionally used crystals, or in a more extended range, in particular in the infra-red.

BRIEF DESCRIPTION OF THE DRAWINGS

Other advantages and particular features will emerge on reading the following detailed description of an illustrative embodiment of the invention, given by way of indication and without implying any limitation, and made with reference to the appended drawings, in which.

DESCRIPTION OF THE PREFERRED EMBODIMENTS

Figure 1:
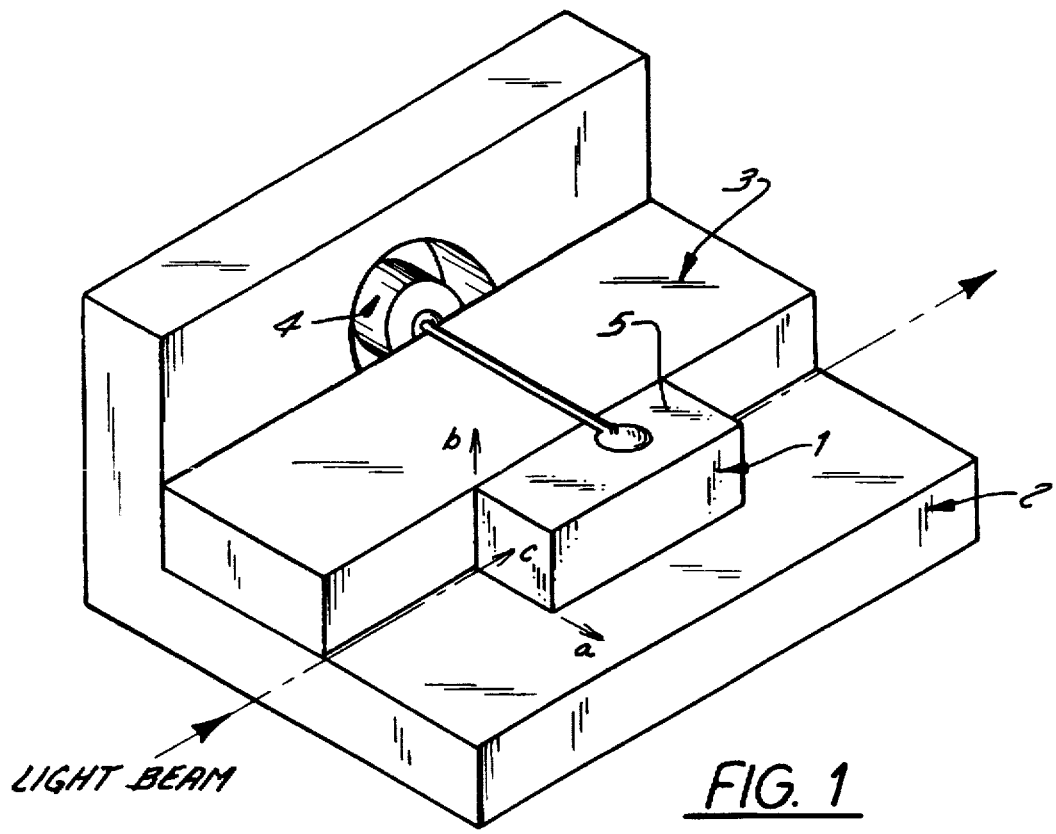
FIG. 1 represents a first electro-optical modulator produced in accordance with the invention.

FIG. 1 presents a first electro-optical modulator produced in accordance with the invention.

It comprises:
- a crystal 1 fashioned in the shape of a parallelepiped,
- an L-shaped casing 2 used as a support, which allows a light beam to be modulated to pass through,
- a voltage source, not represented.

The casing includes two plugs, one of which, having the reference numeral 4, is represented in FIG. 1. These plugs make it possible to connect two opposite faces (one of which is represented, having the reference numeral 5) of the crystal 1 to the voltage source by means of electrodes running over an insulating base 3.

Those faces of the crystal 1 which are connected to the voltage source will, in a conventional fashion, be covered with a metal deposit, for example of gold or silver, in order to create a uniform electric field in the volume of the crystal.

In the example which is described, it will be assumed that a light beam to be modulated penetrates perpendicularly to one of the faces of the crystal, and that the modulator is used in transverse configuration, that is to say that the electric field created in the crystal is substantially perpendicular to the direction of propagation of the light beam in the crystal.

In a conventional fashion, the crystal is oriented in such a way that the beam is normal to a plane formed by two of the crystalline axes of the crystal.

For example, the beam will be normal to the plane formed by the crystalline axes a and b, and will therefore propagate along the crystalline axis c of the crystal.

According to the invention, the crystal will be a solid-solution compound of formula:

$(NH_4)_xRb_{1-x}H_{1-y}D_ySeO_4$, x and y being concentration coefficients varying from 0 to 1.

It will therefore be a solid solution of hydrogenated and/or deuterated ammonium and/or rubidium selenate.

A larger concentration of ammonium makes it possible to widen the passband of the modulator.

A larger concentration of rubidium makes it possible to reduce the value of the half-wave voltage.

A larger concentration of deuterium makes it possible to widen the operating spectrum in the infrared, but makes the synthesis of the crystal more complex. Amongst other things, this requires the use of heavy water, which is not the case if the crystal is only hydrogenated, that is to say if y=0.

For example, it is possible to choose a crystal of rubidium hydrogen selenate, of formula $RbHSeO_4$ (x=0, y =0) or ammonium hydrogen selenate, of formula $NH_4HSeO_4$ (x=1, y=0).

The voltage source will produce an AC voltage. It will thus be possible to produce a voltage including an AC component and a DC component. The presence of a DC component is one way of compensating for the temperature drift of the modulator by shifting its operating point. In practice, it will not be necessary to produce a DC component because of the low temperature sensitivity of the type of crystal employed.

Depending on the nature of the crystal, and more particularly depending on the value of x, an amplifier will optionally be interposed between the voltage source and the crystal. Thus, if the crystal is formed by rubidium hydrogen selenate, it has a reduced half-wave voltage of the order of 270 volts. For a crystal having a dimension L of 10 millimetres and a dimension d of 2 millimetres, a half-wave voltage of the order of 50 volts will be obtained. It will therefore be possible to omit the amplifier. If the crystal is formed by ammonium hydrogen selenate, the reduced half-wave voltage is approximately ten times higher. An amplifier for the voltage produced will then preferably be interposed, thus avoiding the necessity of substantially increasing the ratio L/d of the crystal, which would increase the absorption losses in the crystal. In practice, it will be possible to produce a modulator whose control voltage is limited to approximately 200 volts, that is to say much less than the voltages conventionally used.

In a preferred version, the electric field will be directed substantially parallel to the ferroelectric axis of the crystal. When the crystal is formed from rubidium or ammonium hydrogen selenate, this will be the crystalline axis b. This will make it possible to benefit from the reduced half-wave voltage $V_\pi^*$ having the smallest value. This is advantageous in so far as it will be possible to choose a crystal with smaller ratio L/d, for equal control voltage, compared to a different orientation of the electric field created. This makes the modulator more compact.

Figure 2:
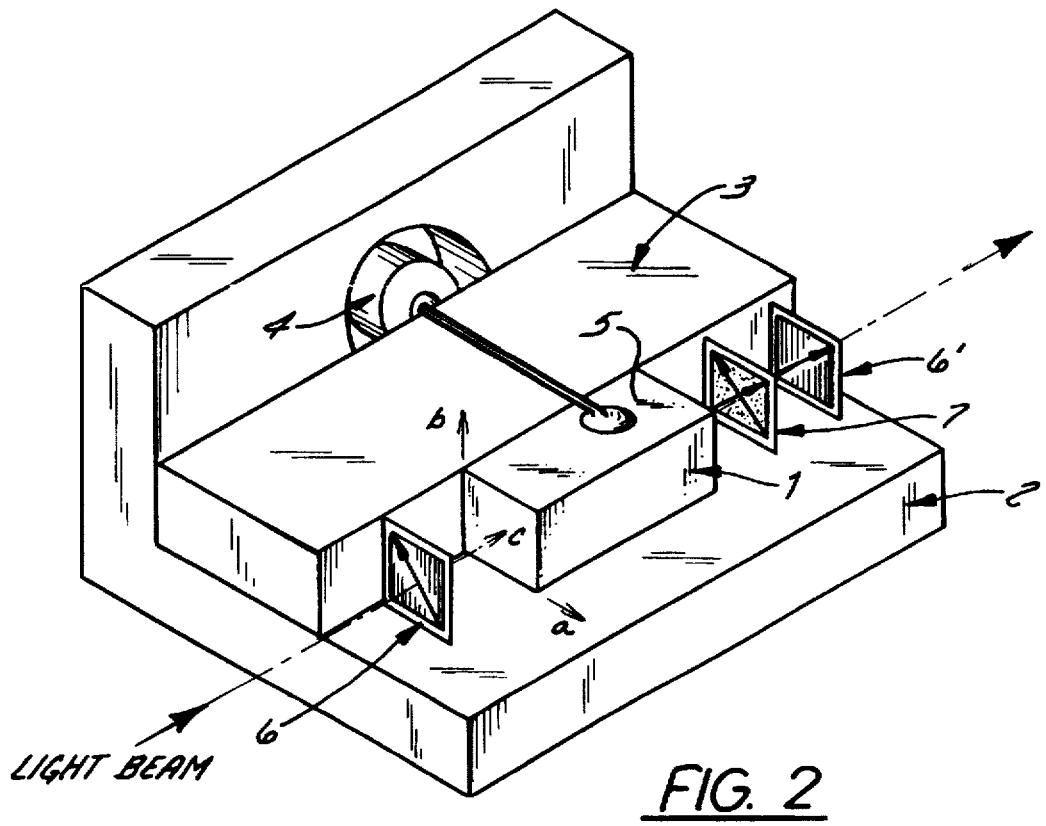
FIG. 2 represents a second electro-optical modulator produced in accordance with the invention.

FIG. 2 presents a second electro-optical modulator produced in accordance with the invention.

In addition to the elements represented in FIG. 1, it comprises:

- a polarizer 6, placed upstream of the crystal, the axis of which is at 45° to the crystalline axes of the crystal 1 forming the input face of this crystal (that is to say the axes a and b in the example described), and in the plane of these axes. The polarizer 6 is therefore conventionally positioned in the incidence plane of the beam to be modulated. Its presence makes it possible to use the modulator as a phase modulator or as a polarization modulator.

- a second polarizer 6' the axis of which is at 90° to the first, may be placed downstream of the crystal 1 in order to use the device as an intensity modulator.

- a quarter-wave plate 7, the fast and slow axes of which are oriented at 45° to the crystalline axes a and b, and in the same plane, may be inserted downstream of the crystal 1, between the latter and the second polarizer 6', in order to obtain a linear response of the intensity variation as a function of the phase shift introduced by the electro-optical effect.

Of course, the presence of one or more polarizers and of a quarter-wave plate will depend on the use of the modulator, depending on whether the desire is to modify the intensity of the light beam, its phase, its polarization, its frequency, or more than one of these characteristics simultaneously.

The description of the modulator which has just been given is, of course, not limiting.

The crystal may be orientated in a different way. Thus, the electric field and the direction of propagation of the light wave may be oriented differently with respect to the crystalline axes, or else not parallel to the crystalline axes of the crystal.

Although a transverse configuration of the modulator has been described, a longitudinal configuration of the field may, of course, be employed. In contrast to the transverse configuration, the longitudinal configuration does not make it possible to reduce the control voltage by altering the dimensions of the crystal. The longitudinal configuration is more suitable for processing large-diameter light beams requiring compactness. It can be used for the generation of laser pulses. However, it requires higher electric voltages, and the modulation is therefore technologically limited to low frequencies. Furthermore, it requires transparent electrodes to be fitted. For its part, the transverse configuration allows large passbands since the half-wave voltage can be reduced by increasing the propagation distance in the crystal and by reducing the inter-electrode distance. It is, however, more sensitive to temperature variations.

A plurality of crystals may also be arranged in series along the direction of propagation of the light beam, and oriented in such a way that their natural birefringences compensate each another.

We claim:

1. An electro-optical modulator comprising 1) an electro-optical crystal wherein the electro-optical crystal is in the form of solid-solution compound of the formula: $(NH_4)_x Rb_{1-x} H_{1-y} D_y SeO_4$, x and y being concentration coefficients varying from 0 to 1, and 2) means for supplying a small control voltage to said crystal in order to modify the polarization, the phase or the intensity of an incident light beam.

2. An electro-optical modulator according to claim 1, wherein the reduced half-wave voltage is less than around 270 V.

3. An electro-optical modulator according to claim 1, wherein the crystal used is a solid solution of rubidium hydrogen selenate.

4. An electro-optical modulator according to claim 1, wherein the crystal used is a solid solution of ammonium hydrogen selenate.

5. Electro-optical modulator comprising:

an electro-optical crystal, a voltage source, electrodes connected to the voltage source in order to produce an electric field in the crystal, wherein the crystal is a solid-solution compound of the formula: $(NH_4)_x Rb_{1-x} H_{1-y} D_y SeO_4$, x and y being concentration coefficients varying from 0 to 1.

6. Modulator according to claim 5, wherein the electrodes are arranged so as to produce in the crystal an electric field substantially parallel to the ferroelectric axis of the crystal.

7. Modulator according to claim 5, wherein the electrodes are arranged so as to produce in the crystal an electric field substantially parallel to the crystalline axis b of the crystal.

8. Modulator according to claim 5, further comprising a polarizer (6) placed upstream of the crystal.

9. Modulator according to claim 5, further comprising a polarizer (6') placed downstream of the crystal.

10. Modulator according to claim 5, further comprising a quarter-wave plate (7) placed downstream of the crystal.

11. Modulator according to claim 5, further comprising two crystals placed in series such that their natural birefringences compensate each other.

12. A method of modifying the intensity of a light beam which utilizes the modulator according to claim 5.

13. A method of modifying the phase of a light beam which utilizes the modulator according to claim 5.

14. A method of modifying the polarization of a light beam which utilizes the modulator according to claim 5.

15. A method of modifying the frequency of a light beam which utilizes the modulator according to claim 5.

16. A method comprising:

providing an electro-optical crystal formed from a solid-solution compound having the formula: $(NH_4)_x Rb_{1-x} H_{1-y} D_y SeO_4$, where x and y are concentration coefficients each having a value of either 0 or 1, transmitting a light beam through said crystal, and supplying a control voltage to said crystal as the light beam is passing through said crystal so as to modulate the polarization, phase, or intensity of the light beam.

* * * * *